US006925263B2

(12) United States Patent
Horne (10) Patent No.: US 6,925,263 B2
(45) Date of Patent: Aug. 2, 2005

(54) METHOD AND APPARATUS FOR TRANSMISSION OF UPSTREAM DATA IN AN OPTICAL NETWORK

(75) Inventor: David M. Horne, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 846 days.

(21) Appl. No.: 09/966,839

(22) Filed: Sep. 28, 2001

(65) Prior Publication Data

US 2003/0063843 A1 Apr. 3, 2003

(51) Int. Cl.[7] .............................................. H04J 14/02
(52) U.S. Cl. ........................... 398/154; 398/31; 398/34
(58) Field of Search ............................. 398/31, 34, 154

(56) References Cited

U.S. PATENT DOCUMENTS

| 6,163,392 A | 12/2000 | Condict et al. .............. 359/124 |
| 6,278,817 B1 | 8/2001 | Dong ........................... 385/37 |
| 6,278,819 B1 | 8/2001 | Reddy .......................... 385/37 |

FOREIGN PATENT DOCUMENTS

| EP | 0425732 | 5/1991 | ............ H04J/14/08 |
| EP | 0777353 | 6/1997 | ............ H04J/14/02 |
| WO | WO-95/17055 | 6/1995 | ............ H04J/14/08 |
| WO | WO-00/74278 | 12/2000 | ............ H04B/10/24 |

OTHER PUBLICATIONS

Chae, C., et al., "A PON System Suitable for Internetworking Optical Network Units Using a Fiber Bragg Grating on the Feeder Fiber", *IEEE Photonics Technology Letters*, vol. 11, 1686–1688, (Dec. 1999).

Saleh, A., et al., "Reflective Single–Mode Fiber–Optic Passive Star Couplers", *Journal of Lightwave Technology*, vol. 6, 392–398, (Mar. 1988).

*Primary Examiner*—Leslie Pascal (57) ABSTRACT

In an optical network that communicates upstream data utilizing a time division multiple access (TDMA) technique, end nodes transmit upstream data on a first wavelength in accordance with a transmission sequence. The end nodes transmit a timing signal on a second wavelength following the upstream data. The timing signals are reflected by a wavelength selective reflective element to each of the end nodes. The end nodes track the timing signals to determine when to transmit upstream data in accordance with the transmission sequence. The optical network includes an outside plant node coupled to the system head end with a distribution fiber. The outside plant node is coupled to the end nodes with drop fibers. The outside plant node includes a splitter/combiner and the wavelength selective reflective element. The wavelength selective reflective element reflects the timing signals on the second wavelength and passes upstream and downstream data on other wavelengths.

30 Claims, 4 Drawing Sheets

METHOD AND APPARATUS FOR TRANSMISSION OF UPSTREAM DATA IN AN OPTICAL NETWORK

FIELD OF THE INVENTION

The present invention pertains to optical networks, and in particular, to passive optical networks (PONs) that provide for transmission and reception of upstream and downstream data between a system controller and a plurality of optical network units (ONUs), and more particularly to PONs that utilize time division multiple access (TDMA) techniques for the upstream data transmissions.

BACKGROUND OF THE INVENTION

The desire to have broadband information services available at residential customer premises has promoted intense interest in the use of optical fiber media. Fiber-to-the-home, in which optical fiber transport is used over the entire path, is appealing because of the large information capacity of optical fiber. Various techniques for communicating over optical fiber include time division multiplexing (TDM) techniques, wavelength division multiplexing (WDM) techniques, sub-carrier multiplexing (SCM) techniques, and spatial division multiplexing (SCM) techniques.

Passive Optical Networks (PONs) are used to provide for communication of two-way high-bandwidth data between a system head end and various end nodes. In PONs, there may be no intervening active components between the system head end or central office and a customer's premises. In other words, PONs generally require no active components for directing optical signals between the system head end and the remotely located end nodes at the customer's premises. PONs therefore, require no power or electronic processing in the field to direct optically encoded information to its destination. A conventional PON generally includes a fiber-optic star or tree coupling device which connects a plurality of optical paths extending from the system head end to the remotely located end nodes. Downstream optical signals are transmitted from the system head end over an optical distribution fiber to an outside plant node where the signal is passively split and distributed to the remotely located r end nodes. The end nodes may transmit optically encoded signals upstream to the outside plant node to form a multiplexed signal on the distribution fiber for distribution to the system head end.

For downstream transmission from a system head end to remotely located end nodes, PONs may implement time division multiplex (TDM) techniques, wavelength division multiplex (WDM) techniques, or other techniques for partitioning data destined for individual end nodes. For upstream transmissions, where many end nodes may access the fiber media, the multiple access may be achieved by, for example, time division multiple access (TDMA), wavelength division multiple access (WDMA), or code division multiple access (CDMA), or combination thereof.

One of the most basic schemes utilizes TDM for downstream data transmissions and TDMA for upstream data transmissions and is often referred to as a power-splitting TDMA PON. Downstream data is a "broadcast and select" time-division multiplexed (TDM) stream of data frames. Each end node receives a broadcast copy of the downstream TDM data and selects its own specific data based on an address within the TDM stream. This TDM stream may occupy a single wavelength. For upstream data transmissions, end nodes achieve multiple access by synchronizing their upstream transmissions so that they occur in a pre-assigned interval. This synchronization reduces or eliminates overlap of upstream data transmissions from the splitter/combiner device after multiple data streams from end nodes are combined. The upstream may be transmitted on a single wavelength and generally is a distinct wavelength from the downstream.

Given the wide variety of potential broadband communication services to be supported over a shared communication network, it is desirable to provide an efficient digital data transmission protocol for the upstream communication paths. Such a data transmission protocol should most fully utilize the available upstream channel bandwidth. Although the art of transmitting downstream data from a system head end to remotely located end nodes is well developed, there remain some problems with the transmission of the upstream data. For example, upstream data communication may implement a time division multiple access (TDMA) technique that includes synchronized multi-step request/grant negotiations between the system head end and the ONUs at the remotely located end nodes in order to prevent upstream packet collisions and pack the upstream transmissions closely together. This level of complexity is undesirable and inefficient and consumes significant network resources.

A less complex upstream data transmission technique employs a "dumb" master/slave protocol with fixed time slot assignments for end nodes to transmit upstream data. The time slots may have fixed sizes or may have cyclically varied fixed sizes. This technique is highly inefficient because the system head end commands all end nodes to halt upstream transmissions and specifies a single end node for transmission. The end node is permitted to transmit after sufficient delay from receiving the halt command since the prior transmitting end node may still have a frame of upstream data in transit that it may collide with. However, when there is no explicit size reservation per upstream data transmission, the allocated time slots must be large enough to accommodate at least one maximum length data frame even when an end node only needs to transmit a minimum length frame or no frame at all since time slots are allocated without regard for need.

Thus, there is a general need for a less complex and efficient way of transmitting upstream data in a PON. There is also a need for a method and system that efficiently transmits upstream data in a PON. There is also a need for a method and system for coordinating transmission of upstream data between remotely located end nodes and a system head end in a PON. There is also a need for a method and apparatus that eliminates the transit delay wait periods that result from long distribution fibers when coordinating transmission of upstream data in a PON. There is also need for a method and apparatus that allow variable length upstream data frames to be sent by each end node without explicit size reservation message exchange by the system head end. There is also a general need for a method and end point-directed multiple access PON with centralized scheduling.

BRIEF DESCRIPTION OF THE DRAWINGS

The invention is pointed out with particularity in the appended claims. However, a more complete understanding of the present invention may be derived by referring to the detailed description when considered in connection with the figures, wherein like reference numbers refer to similar items throughout the figures and:

The description set out herein illustrates the various embodiments of the invention and such description is not intended to be construed as limiting in any manner.

DETAILED DESCRIPTION

The present invention relates to optical networks. In accordance with one of the embodiments, remotely located end nodes transmit upstream data on a first wavelength through an optical network to a system head end followed by a timing signal on a second wavelength. The timing signals are reflected by a wavelength selective reflective element to each of the end nodes. The end nodes track the timing signals to determine when to transmit upstream data in accordance with a transmission sequencing schedule provided by the system head end. In accordance with this embodiment, the optical network includes an outside plant node coupled to the system head end with a distribution fiber. The outside plant node is coupled to the end nodes with drop fibers. The outside plant node may include an optical splitter/combiner element along with the wavelength selective reflective element.

In accordance with another embodiment, a method of coordinating transmission of upstream data between a plurality of end nodes and a system head end is provided. In this embodiment, each end node receives a timing signal from a prior transmitting end node. An end node transmits upstream data to the system head end in response to receipt of the timing signal. In this embodiment, the end nodes transmit a timing signal after transmitting upstream data. The upstream data is transmitted to the system head end on a first optical wavelength and the timing signal is received by the end nodes on a second optical wavelength. A wavelength selective reflective element passes the first optical wavelength while reflecting the second optical wavelength to each of the end nodes through a splitter/combiner element. In this embodiment, a transmission sequencing schedule is received by the end nodes indicating an order for transmission of the upstream data. The end nodes track the timing signals to determine when an end node is to transmit upstream data, and transmit the upstream data on the first wavelength in response to receipt of a number of timing signals corresponding with the order.

In accordance with yet another embodiment, the present invention provides an end node of an optical system that includes a primary transceiver to transmit upstream data on a first optical wavelength, a timing transceiver to receive timing signals on a second optical wavelength, and a controller for tracking the received timing signals to determine a time for transmission of upstream data. The timing signals are sent by remotely located end nodes after transmission of upstream data. A wavelength selective reflective element reflects the timing signals to each of the end nodes. The primary transceiver may receive downstream data on a third optical wavelength.

In accordance with yet another embodiment, the present invention provides an outside plant node of an optical network. The outside plant node may include a wavelength selective reflective element which passes upstream data on a first optical wavelength to a system head end, which reflects timing signals on a second optical wavelength, and which may pass downstream data on a third optical wavelength. The outside plant node may also include a splitter/combiner element to provide the downstream data from the wavelength selective reflective element to each of the end nodes, and to provide the upstream data and the timing signals received from the end nodes to the wavelength selective reflective element. In accordance with this embodiment, the splitter/combiner element may provide reflected timing signals from the wavelength selective reflective element to each of the end nodes. The end nodes may track the reflected timing signals to determine when to transmit the upstream data. Each end node may transmit a timing signal after transmission of upstream data. In accordance with this embodiment, a distribution fiber is coupled between the wavelength selective reflective element and the system head end. A plurality of drop fibers couple the splitter/combiner element with each of the end nodes. The distribution fiber may have a length at least two times as long as the length of one of the drop fibers. The wavelength selective reflective element may comprise a fiber Bragg grating. The splitter/combiner element may comprise a fiber-optic passive star coupler.

Accordingly, one or more of the various embodiments of the present invention eliminate the transit delay wait periods that result from long distribution fibers between a system head end and a distribution node. Furthermore, one or more of the various embodiments of the present invention allow variable length upstream data frames to be sent by end nodes without explicit size reservation and message exchange with the system head end. For example, in a optical network having a twenty kilometer length drop fiber, the various embodiments of the present invention may allow for up to 16 full-length Gigabit Ethernet frames of additional capacity per end node over conventional multi-user TDMA systems that implement a request/grant message exchange or a master/slave method. Additional capacity is achieved at the system head end through a reduction in message processing and response times.

Figure 1:
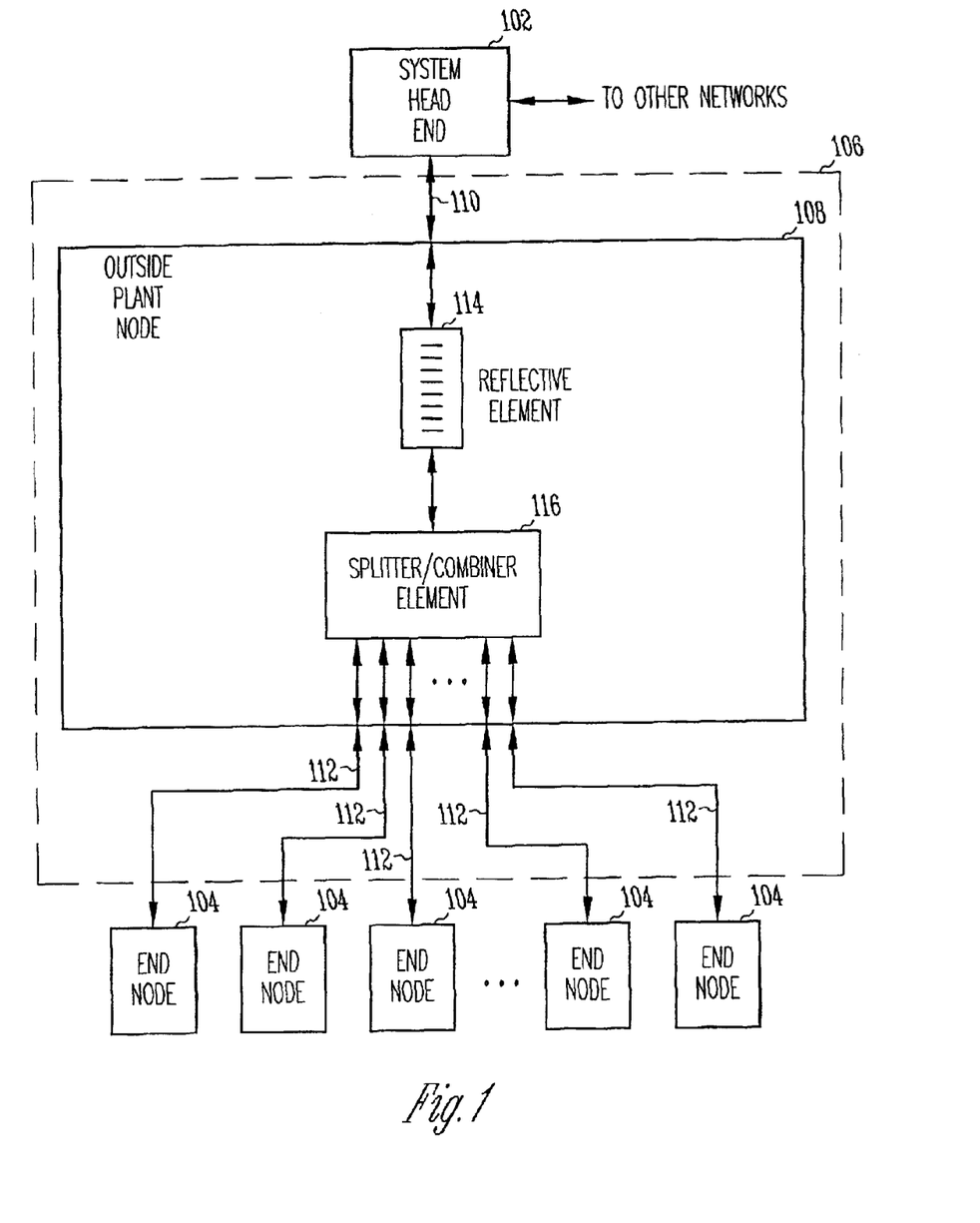
FIG. 1 illustrates a functional block diagram of an optical system in accordance with an embodiment of the present invention.

FIG. 1 illustrates a functional block diagram of an optical system in accordance with an embodiment of the present invention. Optical system 100 includes 30 system head end 102, and one or more optical networks 106 coupled with end nodes 104. System head end 102 communicates upstream and downstream data with end nodes 104 through optical network 106. System head end 102 may also communicate with other networks (not shown) which may function similarly to optical network 106. System head end 102 in general, refers to a system controller for controlling operations of system 100 and may be central office or point of presence. In one embodiment of the present invention, system head end is a central office of a communication system, and may, for example, provide various communication services such as cable television, video on-demand, broadband internet, two-way data, telephone, and two-way video to users at remotely located end nodes through optical network 106. Upstream data generally refers to data transmitted from end nodes 104 to system head end 102 and downstream data generally refers to data transmitted from system head end 102 to one or more end nodes 104. In an optical network, data, such as the upstream and downstream data, is generally transmitted on a carrier having an optical wavelength such as the first or second wavelength.

Optical network 106 includes outside plant node 108 coupled with system head end 102 through distribution fiber 110. End nodes 104 are coupled with outside plant node 108 through drop fibers 112. In accordance with one embodiment, upstream data is transmitted by end nodes 104 through optical network 106 to system head end 102 on a first optical wavelength. End nodes 104 follow the transmission of upstream data with a timing signal on a second optical wavelength. Downstream data may be transmitted from system head end 102 through optical network 106 to end nodes 104 on a third optical wavelength.

Outside plant node 108 includes reflective element 114 to reflect timing signals on the second wavelength while passing the upstream data on the first wavelength and the downstream data on the third wavelength. Reflective element 114 is a wavelength selective reflective element and in one embodiment, may be comprised of a Bragg grating comprised of fiber or waveguide. In this embodiment, reflective element 114 may have a grating spacing at one half the second wavelength.

Outside plant node 108 also includes splitter/combiner element 116 which combines upstream data received from end nodes 104 through drop fibers 112 and provides the combined upstream data to reflective element 114 for conveyance to system head end 102 over distribution fiber 110. Splitter/combiner element 116 also provides downstream data received from reflective element 114 from system head end 102 over distribution fiber 110 to each of end nodes 104 through drop fibers 112. In one embodiment of the present invention, splitter/combiner element 116 may be comprised of an optical star coupler such as a transmissive star coupler that may be configured to divide a single input among a plurality of outputs and combine a plurality of inputs to a single output.

In accordance with one embodiment, upstream data is sequentially transmitted by the end nodes 104 in accordance with a transmission sequence provided by system head end 102. In this embodiment, upstream multiple access is achieved on the first wavelength on distribution fiber 110. In one embodiment of the present invention, each of end nodes 104 may have a network address and may be addressable by system head end 102. Downstream data may be addressed to any one of end nodes 104 through the use of the end node's network address. In this embodiment, downstream data directed to specific end nodes may be received at a first optical wavelength. Downstream data may also be broadcasted to more than one end node. In accordance with one embodiment of the present invention, end nodes 104 may comprise an optical networking unit (ONU) and may provide an interface between system 100 and communications internal to a building. For example, ONUs may be located on the outside of a residence or commercial office building.

Drop fibers 112 may be optical fibers which are generally less than 500 meters in length, but may vary in length from a few meters to several kilometers or more. Distribution fiber 110 is an optical fiber and may be between 10 and 20 kilometers in length but may vary from a several hundred meters to a hundred kilometers or more. Although the lengths of distribution fiber 110 and drop fibers 112 do not affect the operation of the present invention, the benefits of present invention significantly increase with optical networks having a longer distribution fiber and shorter drop fibers. For example, the time delays associated with communicating upstream transmission scheduling with a system head end over the distribution fiber is eliminated. Drop fibers 112 and distribution fiber 110 may be comprised of many optical fibers rather than single optical fibers. Although the embodiments of the present invention are described with the use of optical fiber, in many of the embodiments of the present invention, optical waveguides may be substituted for optical fiber.

Figure 2:
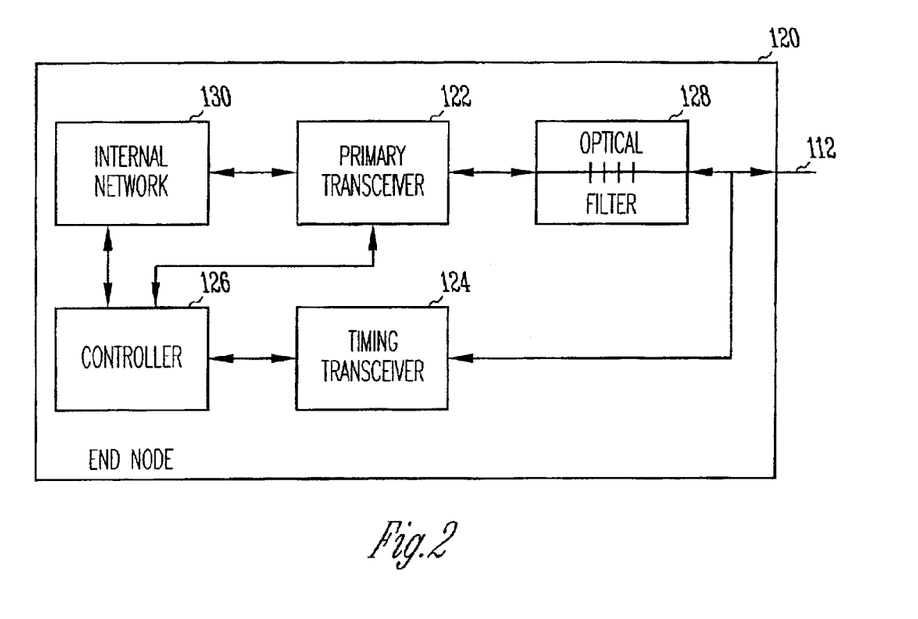
FIG. 2 illustrates a functional block diagram of an end node in accordance with an embodiment of the present invention.

FIG. 2 illustrates a functional block diagram of an end node in accordance with an embodiment of the present invention. End node 120 may be suitable for use as one or more of end nodes 104 (FIG. 1) although other configurations for end node 104 may also be suitable for use with the various embodiments of the present invention. End node 120 includes primary transceiver 122 to transmit upstream data and to receive downstream data over drop fiber 112. End node 120 also includes timing transceiver 124 to receive and transmit timing signals over drop fiber 112. Controller 126 controls operations of primary transceiver 122 and timing transceiver 124 and may interface with internal network 130.

In one embodiment of the present invention, controller 126 causes timing transceiver 124 to transmit a timing signal, which may be a timing pulse, after the transmission of upstream data by primary transceiver 122. Controller 126 may also receive and store a transmission sequence and track a number of timing signals received by timing transceiver 124 to determine when end node 120 is allocated time to transmit upstream data. In this embodiment, the transmission sequence is provided by a system head end and may be followed by a synchronization signal provided by the system head end to initiate a transmission cycle. In an alternate embodiment of the present invention, the receipt of the transmission sequence may initiate a new transmission cycle.

In one embodiment of the present invention, an end node may transmit a timing signal prior to completion of transmission of the upstream data. In this embodiment, the timing signal is transmitted early so that it may arrive at the next end node in the transmission sequence early enough for the next end node to start transmission of upstream data so that gaps between the upstream data transmissions are reduced when combined on drop fiber 110. In this embodiment, an end node may determine an early timing signal transmission time using at least the signal delay between itself and reflective element 114 and the signal delay between the next end node in the sequence and reflective element 114.

In accordance with one embodiment of the present invention, timing signals may be pulses or another other signal recognizable by end nodes which are transmitted on the second wavelength. In addition, timing signals may be embedded with control or status information for use by other end nodes. Reflective element 114 (FIG. 1) may reflect such timing pulses or other signals in the upstream direction received on the second wavelength.

End node 120 may also include optical filter 128 to reject timing signals and out-of-band data while passing in-band data including upstream data on the first wavelength and downstream data on the third wavelength. In this embodiment, timing signals and the synchronization pulse are not received by primary transceiver 122.

In one embodiment of the present invention, end node 120 may include internal network 130, while in other embodiments of the present invention, internal network 130 may not be part of end node 120. For example, when end node 120 is an optical network unit residing on the outside of a structure such as a building, internal network 130 may reside inside the structure. In one embodiment of the present invention, internal network 130 is an Ethernet capable of communicating at high speeds and may be capable of communicating at up to Gigabit speeds and greater.

Primary transceiver 122 converts downstream data from a form received over drop fiber 112 (FIG. 1) of optical network 106 (FIG. 1) to a form suitable for transmission through internal network 130. Primary transceiver 122 also converts upstream data received from internal network 130 to a form suitable for transmission through optical network 106 (FIG. 1). In this embodiment, upstream data may comprise Ethernet frames which are received from network 130, for example, on an RF carrier frequency and transmitted by primary transceiver 122 on the first optical wavelength over drop fiber 112. Downstream data may also comprise Ethernet frames which are received from drop fiber 112 on the third optical wavelength and provided by primary transceiver 122 to network 130 on an RF carrier frequency. Primary transceiver 122 may provide for the conversion of data between optical wavelengths and RF frequencies.

In conventional communication systems, a data frame, such as an Ethernet frame, may vary in size by more than 2200%. To make optimal use of an upstream channel, each successive end node desirably would pack its transmission onto the channel immediately following the previous transmission irrespective of the length of the prior frame and the delay variation due to distance variations between stations. This may be accomplished through the use of a tight tolerance time base provided by the system head end that is known by the remotely located end nodes. Each end node must therefore know its transit time offset between the head end and the other end nodes so that transmissions can be delayed to avoid collisions on the channel. To implement this conventional technique in a conventional PON, end nodes are required to send a reservation request to the head end for the length of data frame desired to be transmitted upstream. Some time later when the system head end has scheduled the request, the head end notifies the end node of the time slot when the end node may transmit its upstream data. After receiving this grant, the end node may then transmit during the reserved times slot. There is significant overhead and delay in this multi-step channel access negotiation process. It requires that a high degree of complexity and flexibility be designed into the TDMA protocol. As can be seen, the present invention significantly reduces the complexity and improves the flexibility of TDMA upstream data transmissions.

Figure 3:
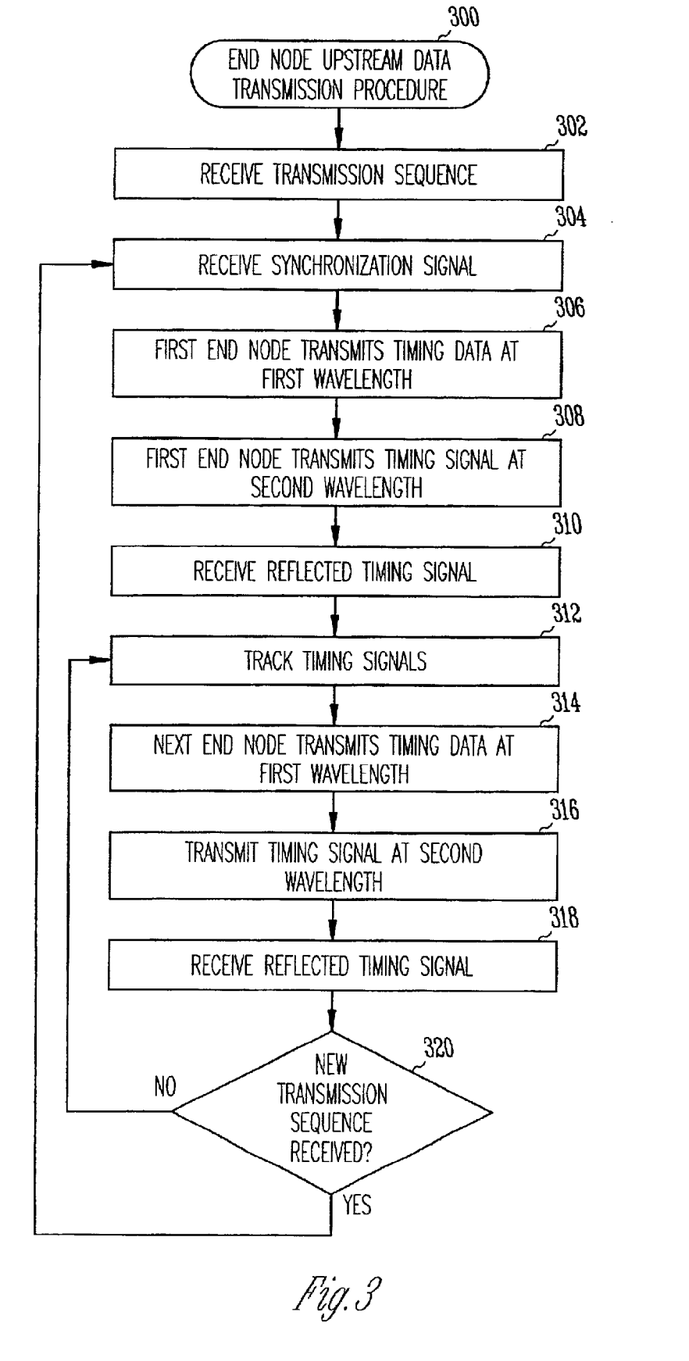
FIG. 3 illustrates a flow chart of an end node data transmission procedure in accordance with an embodiment of the present invention.

FIG. 3 illustrates a flow chart of an end node data transmission procedure in accordance with an embodiment of the present invention. Portions of procedure 300 may be performed by one or more of end nodes 120 (FIG. 2) for communication of upstream data through an optical network, although other end node configurations may also be suitable for performing procedure 300. In one embodiment of the present invention, controller 126 (FIG. 2) may be configured with software to control primary transceiver 122 (FIG. 2) and timing transceiver (FIG. 2) of end node 120 (FIG. 2) to perform some of the operations of procedure 300. In general, most operations of procedure 300 are performed by an end node of an optical network for the transmission of upstream data to a system head end. The upstream data may be transmitted at an upstream wavelength, and multiple access may be achieved via TDMA techniques. In other words, each end node may transmit upstream data during a time period when other end nodes refrain from transmission of upstream data. The upstream data may be packetized data and may be addressed to various destinations including other end nodes.

In operation 302, the end nodes receive a transmission sequence from the system head end. The transmission sequence may provide a transmission order or a sequence in which the end nodes transmit upstream data. The transmission sequence may provide for sequential transmission of upstream data by each end node of the network. The transmission sequence may be conveyed in data framed and may convey additional information such as operational, status or network management information. In one embodiment, the transmission sequence may be received by the end nodes as part of a transmission sequence message directed to the end nodes and may be identified by the message header. In one embodiment of the present invention, the transmission sequence is received as downstream data directed to all end nodes, and may also contain a combination of multicast, broadcast and unicast information.

In operation 304, a synchronization signal, such as a pulse or other message, transmitted by the system head end is received by the end nodes. The synchronization signal is uniquely identifiable by the end nodes and may be transmitted as out-of-band data at a different wavelength than downstream data. The synchronization signal may initiate the transmission cycle. In one embodiment, a synchronization message is transmitted to the end nodes instead of a synchronization pulse. The synchronization message may contain additional identifiers, status information or other operational, administrative or management data. In an alternate embodiment of the present invention, the receipt of the transmission sequence in operation 302 initiates the transmission cycle and operation 304 may not be performed.

In operation 306, a first end node as indicated by the transmission sequence transmits upstream data. The transmission of upstream data in operation 306 is responsive to the initiation of the transmission cycle which may be the receipt of a transmission sequence or, in one of the alternate embodiments, receipt of a synchronization pulse subsequent to the receipt of the transmission sequence. The first end node transmits upstream data on a first wavelength and in accordance with the protocol requirements of the optical network. In accordance with one embodiment of the present invention, end nodes are not assigned a predetermined or fixed number of upstream time-slots for transmission of upstream data, and accordingly, the amount of upstream data transmitted, for example in a frame, by the first end node in operation 306 may vary significantly. In one embodiment, the transmission sequencing message may indicate restrictions on upstream data transmissions.

In operation 308, the first end node transmits a timing signal at the completion of transmission of the upstream data. The timing signal may be transmitted on a second wavelength which may be at an out-of-band optical wavelength. The timing signal may be conveyed from the first end node through a drop fiber to an outside plant node of the optical network. At the outside plant node, the timing signal is reflected to end nodes coupled to the optical network.

In operation 310, the end nodes of the optical network receive the timing signal from the first end node. In accordance with one embodiment, the timing signal is reflected by a reflective element of the outside plant node to each end node. In this embodiment, a wavelength selective reflective element may be used to reflect timing signals on the second wavelength while passing upstream and downstream data on other wavelengths.

In operation 312, the end nodes track received timing signals to determine when an end node is allocated time to transmit upstream data. For example, an end node which is third in the transmission sequence may transmit upstream data after receipt of two timing signals (e.g., the timing signal transmitted by the first node and the timing signal transmitted by the second node). When an end node determines it is a next node for transmission of upstream data, the next end node performs operation 314.

In operation 314, the next end node in the transmission sequence may transmit upstream data. Similar to operation 306, upstream data is transmitted on a first wavelength and may comprise various quantities of data. In one embodiment, a frame such as an Ethernet frame may be transmitted. The size of the upstream frame may vary in accordance with the data transmission requirements of the transmitting end node. In operation 316, the end node transmitting upstream data in operation 314 follows the upstream data with a timing signal which may be on the second wavelength.

In one embodiment of the present invention, when an end node has no upstream data to transmit at the time when it is the next node in the sequence, the end node may refrain from performing operation 314 and may perform operation 316 to allow the end nodes to continue to track timing signals to determine their proper transmission time.

In operation 318, the end nodes of the optical network receive the timing signal from the prior transmitting end node. Similar to operation 310, the timing signal may be reflected by a wavelength selective reflective element of the outside plant node to each end node.

In an alternate embodiment of the present invention, instead of transmitting a timing signal following the transmission of upstream data, other means of out-of band signaling may be employed to indicate when an end node completes transmission of data. In this alternate embodiment, end nodes are responsive to this alternate out-of-band signaling. For example, the prior transmitting end node may include an identifier on an out-of-band wavelength to identify itself in the transmission sequence. The identifier may be read by other nodes to determine a next end node. The identifier message may be reflected by a wavelength selective reflective element at the outside plant node configured to reflect the out-of-band wavelength.

In operation 320, the end nodes determine if a new transmission sequence is received. When a new transmission sequence has not been received, operations 312 through 318 are repeated. Accordingly, end nodes continue to track the number of timing signals and sequentially transmit upstream data in accordance with the transmission sequence until a new transmission sequence is received. In one embodiment of the present invention, end nodes may utilize a timer to determine when an end of a transmission sequence should occur.

When a new transmission sequence is received, operations 304 through 318 are repeated and the end nodes transmit upstream data in accordance with the new transmission sequence. In one embodiment of the present invention, a system head end may send a synchronization signal without the prior sending of a new transmission sequence. In this embodiment, operations 304 through 318 are repeated and the end nodes may resynchronize to the synchronization pulse and transmit upstream data in accordance with the originally received transmission sequence.

Figure 4:
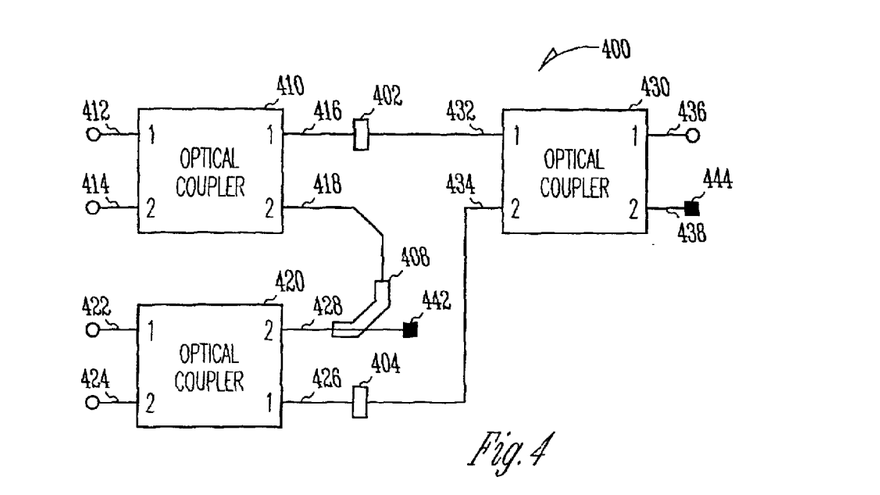
FIG. 4 illustrates a functional block diagram of one embodiment of a reflective/transmissive optical coupler suitable for use with an embodiment of the present invention.

FIG. 4 illustrates a functional block diagram of a reflective/transmissive optical coupler suitable for use with an embodiment of the present invention. Reflective/transmissive coupler 400 may be used in place of reflective element 114 (FIG. 1) and splitter/combiner element 116 (FIG. 1) of outside plant node 108 (FIG. 1) of optical network 106 (FIG. 1). Reflective/transmissive coupler 400, in general operates as an optical transmissive combiner and an optical transmissive splitter for certain wavelengths, such as the upstream and downstream wavelengths. For a particular wavelength or wavelengths, such as the second wavelength, reflective/transmissive coupler 400 operates similar to a reflective splitter. As used herein, the term "second wavelength" may refer to one or more particular wavelengths for which reflective/transmissive coupler 400 may function as a reflective coupler while the terms "first" and "third" wavelengths may refer to wavelengths for which reflective/transmissive coupler 400 may function as a transmissive combiner and/or transmissive splitter.

As used in reference to reflective/transmissive coupler 400, the terms "input" and "output" are used for convenience to designate the flow of signals from left to right with respect to optical couplers 410, 420 and 430 and reflective/transmissive coupler 400. Optical couplers 410, 420 and 430, however, may operate equally in both directions and therefore the terms "input" and "output" may be interchangeable.

Reflective/transmissive coupler 400 includes first optical coupler 410, second optical coupler 420 and third optical coupler 430. Couplers 410, 420 and 430 combine signals received at inputs 412, 414, 422 and 424 and provide a combined signal at output 436. Optical couplers 410, 420 and 430 may be transmissive star couplers, and as illustrated in FIG. 4, may be 2×2 transmissive star couplers. In addition, couplers 410, 420 and 430 power divide an optical signal received at output 436 and provide the divided signal to each input 412, 414, 422 and 424. Optic fibers or optical waveguides may be used to couple signals on optical wavelengths between the various elements of reflective/transmissive coupler 400. Couplers 410, 420 and 430 may use 2×2 evanescent couplers such as fused biconic taper devices. Reflective/transmissive coupler 400 may also include one or more optical terminations 444 coupled to output 438 of coupler 430 to reduce reflections of wavelengths at any unused outputs.

When reflective/transmissive coupler 400 is used in an optical network such as network 106 (FIG. 1), the signals received at inputs 412, 414, 422 and 424 may be viewed as upstream signals while the signal received at output 436 may be viewed as downstream signals. Upstream and downstream signals may, for example, be on the first and third wavelengths respectively, although nothing prohibits both the upstream and downstream signals from being on the same wavelength or on many different wavelengths.

Reflective/transmissive coupler 400 also includes first wavelength selective reflective element 402 to reflect the second wavelength from output 416 of first coupler 410 back through first coupler 410 to inputs 412, 414. First wavelength selective reflective element 402 passes upstream and downstream wavelengths between output 416 of coupler 410 and input 432 of coupler 430. Reflective/transmissive coupler 400 also includes second wavelength selective reflective element 404 to reflect the second wavelength from output 426 of second coupler 420 back through second coupler 420 to inputs 422, 424. Second wavelength selective reflective element 404 passes upstream and downstream wavelengths between output 426 of coupler 420 and input 434 of coupler 430.

In one embodiment, at least one of either the first or second wavelength reflective elements 402, 404 may include a Bragg grating of fiber or waveguide which may have a grating spacing of one-half the second wavelength. In this embodiment, the Bragg grating substantially reflects the second wavelength while passing other wavelengths such as the first and third wavelengths. In another embodiment, at least one of either the first or second wavelength reflective elements 402, 404 may include an optical lens having a coating to substantially reflect at least the second wavelength while passing other wavelengths such as the first and third wavelengths.

Reflective/transmissive coupler 400 also includes wavelength selective coupling element 408 to couple the second wavelength between outputs 418, 428 of the first and second couplers 410, 420 and inhibit transmission of the first wavelength between outputs 418, 428 of the first and second couplers 410, 420. In one embodiment of reflective/transmissive coupler 400, wavelength selective coupling element 408 is a wavelength selective coupler and may be comprised of long period fiber gratings having a resonance wavelength at the second wavelength. In this embodiment, wavelength selective coupling element 408 may receive signals on the second wavelength from output 428. A long period grating in an optic fiber of element 408 converts the second wavelength from a core mode in the optic fiber to a cladding mode of that fiber without substantially affecting other wavelengths. The second wavelength propagates in the cladding mode through a region having close or physical contact with a second optic fiber and excites a similar cladding mode in the second fiber. A second long period grating in the second fiber transforms the second wavelength from the cladding mode into a core mode of the second fiber. Accordingly, only light at the resonance wavelength (e.g., the second wavelength) of the long period gratings is coupled from the core of the first fiber to the core of the second fiber. The second fiber provides the coupled output of wavelength selective coupling element 408.

Accordingly, only resonant wavelengths such as the second wavelength may be coupled from output 428 of coupler 420 to output 418 of coupler 410. Other wavelengths pass through to the direct output of element 408 and are provided to termination 442. Similarly, only resonant wavelengths such as the second wavelength may be coupled from output 418 of coupler 410 to output 428 of coupler 420. Termination 442 is an optical termination and may be coupled to a direct output of wavelength selective coupling element 408 to reduce reflections of the non-resonant wavelengths back to the direct output of wavelength selective coupling element 408.

In another embodiment of reflective/transmissive coupler 400, wavelength selective coupling element 408 may be a blaze grating which utilizes a side tap to selectively couple certain wavelengths, such as the second wavelength, while passing other wavelengths.

In one embodiment of reflective/transmissive coupler 400, wavelength selective coupling element 408 and termination 442 may be coupled directly to output 418 of coupler 410 with coupled port of wavelength selective coupling element 408 coupling with output 428 of coupler 420. In another embodiment of reflective/transmissive coupler 400, input 434 may be coupled to the direct output of wavelength selective coupling element 408 while termination 442 may be coupled to wavelength selective reflective element 404.

The various embodiments of reflective/transmissive coupler 400 may easily be extended to reflective/transmissive couplers having a greater number of inputs and may also include reflective/transmissive couplers having more than one output. For example, additional 2×2 transmissive star couplers may be added, or other types of transmissive star couplers may be used. For example, 4×4 transmissive star couplers may be used with additional wavelength selective coupling elements and additional wavelength selective reflective elements.

Although the various embodiments of reflective/transmissive coupler 400 are described as operating as a reflective coupler at a particular wavelength (i.e., the second wavelength), the elements of reflective/transmissive coupler 400 may be configured to selectively reflect and selectively couple more than one particular wavelength allowing reflective/transmissive coupler 400 to operate as a reflective coupler at more than one wavelength.

Figure 5:
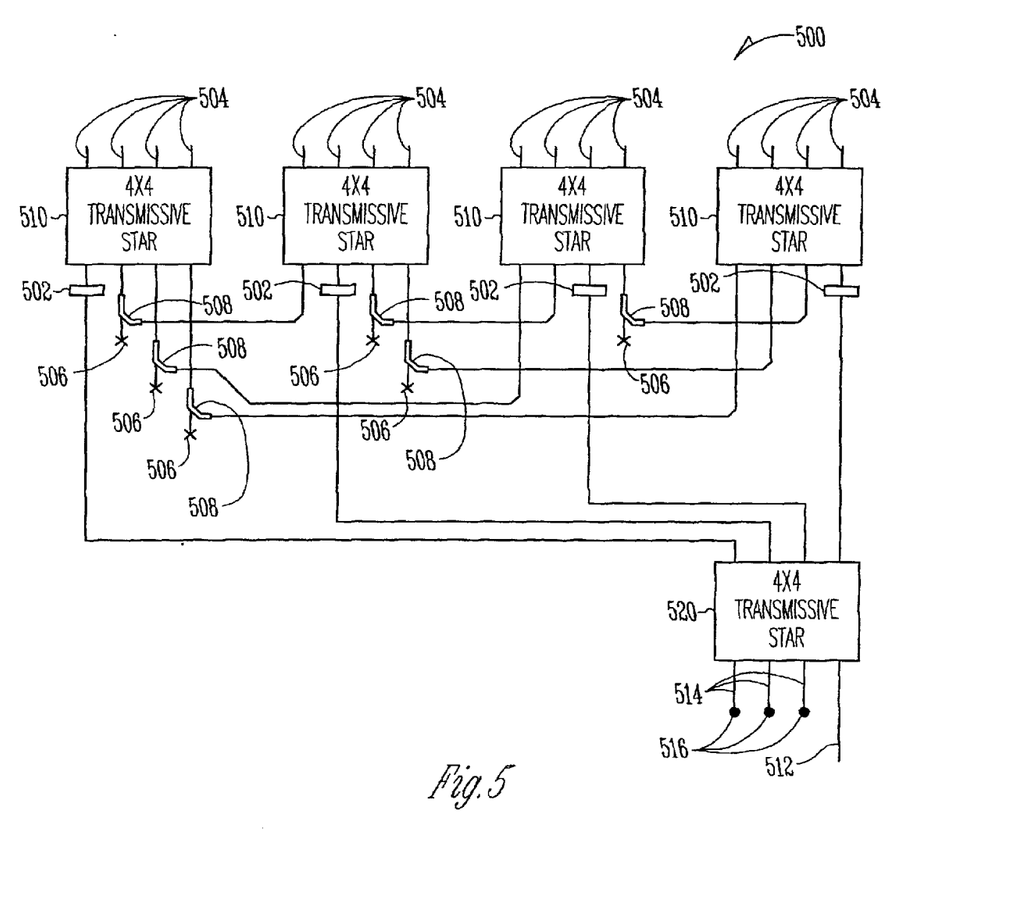
FIG. 5 illustrates a functional block diagram of another embodiment of a reflective/transmissive optical coupler suitable for use with an embodiment of the present invention.

FIG. 5 illustrates a functional block diagram of another embodiment of a reflective/transmissive optical coupler suitable for use with an embodiment of the present invention. Reflective/transmissive coupler 500 may be used in place of reflective element 114 (FIG. 1) and splitter/combiner element 116 (FIG. 1) of outside plant node 108 (FIG. 1) of optical network 106 (FIG. 1). In general, reflective/transmissive coupler 500 operates similarly to reflective/transmissive coupler 400. Upstream wavelengths received at any of inputs 504 are combined in couplers 510 and coupler 520 and provided to one or more outputs 512, 514. Downstream wavelengths received at one or more outputs 512, 514 are provided to each input 504. For particular wavelengths, such as the second wavelength, received at inputs 504, wavelength selective reflective elements 502 reflect the second wavelength back through one of couplers 510 and wavelength selective coupling elements 508 couple the second frequency to other couplers 510 so that when the second wavelength is received at any of inputs 504, it is provided back to all inputs 504. Terminations 506 may be used to terminate wavelengths to reduce reflections back to wavelength selective coupling elements 508. Terminations 516 may be used to terminate unused outputs of coupler 520.

As used in reference to reflective/transmissive coupler 500, the terms "input" and "output" are used for convenience to designate the flow of signals from left to right with respect to optical couplers 510 and 520 and reflective/transmissive coupler 500. Optical couplers 510 and 520, however, may operate equally in both directions and therefore the terms "input" and "output" may be interchangeable.

In the embodiment of reflective/transmissive coupler 500 illustrated in FIG. 5, couplers 510 and coupler 520 may be 4×4 transmissive star couplers. Each 4×4 transmissive star coupler may be comprised of several 2×2 transmissive star couplers. Wavelength selective reflective elements 502 may function similarly to wavelength selective reflective elements 402 or 404 (FIG. 4), wavelength selective coupling elements 508 may function similarly to wavelength selective coupling element 408 (FIG. 4) and terminations 506 may function similarly to termination 442 (FIG. 4).

Although the embodiment of reflective/transmissive coupler 500 is illustrated with 4×4 transmissive star couplers, reflective/transmissive coupler 500 may be extended by those skilled in the art to utilize, for example, 16×16 transmissive star couplers to provide additional inputs and/or outputs. In one embodiment, couplers 510 and 520 may use 2×2 evanescent couplers such as fused biconic taper devices as basic building blocks to form 4×4 transmissive couplers. Furthermore, in another embodiment of reflective/transmissive coupler 500, couplers 510 may be configured in a hierarchy. In an alternate embodiment of reflective/transmissive coupler 500, one or more or the inputs of coupler 520 may couple to a direct output of one of frequency selective coupling elements 508 rather than coupling with frequency selective reflective element 502.

In one embodiment of the present invention, timing signals may be transmitted by end nodes on the same wavelength as the upstream data. In this embodiment, a reflective transmissive coupler may be configured to pass the upstream data wavelength to the system head end as well as reflect it back to the end nodes. In this embodiment, the timing signal may be part of the upstream data and/or may be encoded with additional information, for example, to indicate the transmitting end node.

Through the use of the various embodiments of reflective/transmissive coupler 400 (FIG. 4) or the various embodiments of reflective/transmissive coupler 500 as part of outside plant node 108 (FIG. 1), upstream data transmitted by end nodes 104 (FIG. 1) on the first wavelength is not reflected or transmitted to other end nodes but is passed to system head end 102 (FIG. 1). On the other hand, timing signals transmitted on the second wavelength by end nodes 104 (FIG. 1) after transmission of upstream data are provided to each of the end nodes. Downstream data transmitted on the third wavelength is provided from the system head end 102 (FIG. 1) through outside plant node 108 (FIG. 1) to each of the end nodes 104 (FIG. 1).

Thus, a method and apparatus for coordination and transmission of upstream data in an optical network has been described. The transit delay wait periods that result from long distribution fibers between a system head end and a distribution node are eliminated. Variable length upstream data frames may be sent by each end node without explicit size reservation and message exchange by the system head end. Up to 16 full-length Gigabit Ethernet frames or greater of additional capacity per end node is achieved over some conventional systems. Additional improvement of conventional systems is achieved through the reduction in processing and scheduling at the head end.

The foregoing description of the specific embodiments reveals the general nature of the invention sufficiently that others can, by applying current knowledge, readily modify and/or adapt it for various applications without departing from the generic concept, and therefore such adaptations and modifications are intended to be comprehended within the meaning and range of equivalents of the disclosed embodiments.

It is to be understood that the phraseology or terminology employed herein is for the purpose of description and not of limitation. Accordingly, the invention is intended to embrace all such alternatives, modifications, equivalents and variations as fall within the spirit and broad scope of the appended claims.

What is claimed is:

1. A method of coordinating transmission of data between a plurality of end nodes and a system head end comprising:
receiving at each of the end nodes a timing signal from a prior transmitting end node, the timing signal being reflected to each of the end nodes; and
transmitting upstream data to the system head end by one of the end nodes in response to receipt of the timing signal.

2. The method as claimed in claim 1 further comprising transmitting a second timing signal by the one end node after transmitting the upstream data.

3. The method as claimed in claim 2 wherein the upstream data is transmitted to the system head end on a first optical wavelength, the timing signal is received by the end nodes on a second optical wavelength, and a wavelength selective reflective element passes the first optical wavelength and reflects the second optical wavelength to each of the end nodes through a splitter/combiner element.

4. The method as claimed in claim 3 further comprising:
receiving, from the system head end, a transmission sequence indicating an order for transmission of the upstream data for the end nodes; and
tracking timing signals to determine when an end node is scheduled time to transmit the upstream data; and
transmitting the upstream data on the first wavelength in response to receipt of a number of timing signals corresponding with the order.

5. The method as claimed in claim 4 wherein the transmission sequence is received on a third optical wavelength, and wherein the wavelength selective reflective element also passes the third optical wavelength.

6. The method as claimed in claim 5 wherein the upstream data is conveyed on the first optical wavelength and downstream data is conveyed on the third optical wavelength, and wherein an ultimate destination of the upstream data includes one of the end nodes of the plurality.

7. The method as claimed in claim 5 further comprising receiving a synchronization pulse from the system head end subsequent to the receiving the transmission sequence, the synchronization pulse indicating to the end nodes when to start the transmission sequence.

8. The method as claimed in claim 5 further comprising:
receiving, at a first of the end nodes, downstream data on the third optical wavelength at a primary transceiver;
receiving, at the first of the end nodes, timing signals on the second optical wavelength at a timing transceiver;
blocking, at the first of the end nodes, the timing signals on the second optical wavelength at the primary transceiver,
transmitting a timing signal by the timing transceiver on the second optical wavelength prior to the primary transceiver completing transmission of the upstream data on the first optical wavelength.

9. An end node of an optical system comprising:
a primary transceiver to transmit upstream data on a first optical wavelength;
a timing transceiver to receive timing signals on a second optical wavelength; and
a controller to track the received timing signals to determine a time for transmission of the upstream data,
wherein the timing signals are sent by end nodes of a plurality of end nodes responsive to transmission of upstream data, and wherein the timing signals are reflected by a wavelength selective reflective element to each of the end nodes.

10. The end node as claimed in claim 9 wherein the primary transceiver receives downstream data on a third optical wavelength, and wherein the timing transceiver transmits the timing signal prior to completion of the primary transceiver transmission of upstream data.

11. The end node as claimed in claim 10 wherein the end node is one of a plurality of end nodes, and wherein the primary transceiver receives a transmission sequence, the transmission sequence indicating a transmission order for transmitting the upstream data for each of the plurality of end nodes, the controller determining a transmission time for the end node based on tracking the received timing signals,
and wherein the timing transceiver transmits a timing signal on the second optical wavelength responsive to transmission of the upstream data by the primary transceiver on the first optical wavelength.

12. The end node as claimed in claim 11 further comprising a wavelength selective filter coupled to the primary transceiver to pass the first and third optical wavelengths and inhibit passage of the second optical wavelength, and wherein the transmission sequence is received by the primary transceiver on the third optical wavelength.

13. The end node as claimed in claim 12 wherein the wavelength selective reflective element is part of an outside plant node coupled to a system head end by a distribution fiber, wherein the timing signals are reflected by the wavelength selective reflective element to each of the end nodes through a splitter/combiner element coupled to each end node by a drop fiber, the splitter/combiner element being part of the outside plant node, and wherein the system head end provides the transmission sequence to the outside plant node for distribution to each end node, and the splitter/combiner element combines upstream data received by the end nodes.

14. An optical network comprising:

a distribution fiber to convey upstream data to a system head end;

an outside plant node to receive downstream data from the distribution fiber; and a plurality of drop fibers to couple end nodes with the outside plant node, each end node to transmit a timing signal responsive to transmission of upstream data, the outside plant node to reflect the timing signal to each of the end nodes, each end node to track received timing signals and transmit upstream data in accordance with a transmission sequence.

15. The optical network as claimed in claim 14 wherein the transmission sequence is conveyed by the system head end system to each of the end nodes, the transmission sequence indicating an order for each of the end nodes to transmit upstream data, wherein each end node tracks received timing signals to determine when to transmit upstream data in accordance with the transmission sequence.

16. The optical network as claimed in claim 15 wherein the outside plant node comprises:

an optical splitter/combiner element coupled to each of the drop fibers; and a wavelength selective reflective element coupled between the distribution fiber and the optical splitter/combiner element, the wavelength selective reflective element reflects the timing signals back to the optical splitter/combiner element.

17. The optical network as claimed in claim 16 wherein upstream data is on a first optical wavelength, the timing signals are on a second optical wavelength, and the downstream data is on a third optical wavelength, and wherein the wavelength selective reflective element is comprised of a Bragg grating to reflect the timing signals, to pass the upstream data from the optical splitter/combiner element to the distribution fiber and to pass the downstream data from the distribution fiber to the optical splitter/combiner element.

18. The optical network as claimed in claim 17 wherein the distribution fiber is at least two times longer than a predetermined percentage of the drop fibers.

19. A method of transmitting data from a plurality of end nodes through an optical network comprising:

receiving upstream data from a first of the end nodes;

reflecting a timing signal to each of the end nodes by a wavelength selective reflective element; and receiving upstream data from a next of the end nodes, the next end node transmitting the upstream data in response to receipt of the timing signal.

20. The method as claimed in claim 19 wherein data received from the first of the end nodes is transmitted to a system head end on a first optical wavelength, wherein the timing signal is transmitted by the first of the end nodes on a second optical wavelength, and wherein the wavelength selective reflective element reflects the second optical wavelength and passes the first optical wavelength.

21. The method as claimed in claim 20 further comprising providing a transmission sequence from the system head end to each of the end nodes, the transmission sequence comprising a sequence for the end nodes to transmit upstream data, wherein a next of the end nodes in the sequence transmit data in response to a timing signal received from a preceding one of the end nodes in the sequence.

22. The method as claimed in claim 21 wherein the end nodes track timing signals reflected by the wavelength selective reflective element to determine when each of the end nodes is scheduled to transmit upstream data.

23. The method as claimed in claim 20 wherein the wavelength selective reflective element is comprised of a Bragg grating.

24. The method as claimed in claim 22 further comprising transmitting the transmission sequence on a third optical wavelength, and wherein the wavelength selective reflective element passes the optical third wavelength.

25. The method as claimed in claim 20 further comprising splitting downstream data provided from the system head end among each end node of the plurality with a splitter/combiner element, the downstream data being on a third optical wavelength, and wherein the wavelength selective reflective element to pass the downstream data on the third optical wavelength.

26. The method as claimed in claim 25 further comprising combining the upstream data with the splitter/combiner element, the upstream data transmitted by the end nodes on the first optical wavelength, the wavelength selective reflective element to pass the upstream data on the first optical wavelength.

27. The method as claimed in claim 25 wherein the wavelength selective reflective element couples a distribution fiber with a splitter/combiner element, the method further comprising:

conveying the upstream and downstream data between the system head end and the wavelength selective reflective element through a distribution fiber; and conveying the upstream and downstream between the splitter/combiner element and each end node with at least one drop fiber, wherein the distribution fiber has a length that is at least two times as long as a length of one of the drop fibers.

28. An outside plant node comprising:

a wavelength selective reflective element to pass upstream data on a first optical wavelength to a system head end, to reflect timing signals of a second optical wavelength, and to pass downstream data on a third optical wavelength; and a splitter/combiner element to provide the downstream data from the wavelength selective reflective element to each of the plurality of end nodes, and to provide the upstream data and the timing signals received from the end nodes to the wavelength selective reflective element, wherein the splitter/combiner element provides reflected timing signals from the wavelength selective reflective element to each of the end nodes, and wherein the end nodes track the reflected timing signals to determine when to transmit the upstream data, each end node transmitting a timing signal responsive to transmission of the upstream data.

29. The outside plant node as claimed in claim 28 wherein a distribution fiber is coupled between the wavelength selective reflective element and the system head end, and at least one of a plurality of drop fibers couple the splitter/combiner element with each end node of the plurality, the distribution fiber having a length at least two times as long as a length of one of the drop fibers.

30. The outside plant node as claimed in claim 29 wherein the wavelength selective reflective element comprises a Bragg grating and the splitter/combiner element comprises an optical coupler.

* * * * *